March 8, 1960 E. J. GEIGER 2,927,563
INTERNAL COMBUSTION ENGINE COOLING FAN STRUCTURE AND
TEMPERATURE RESPONSIVE CONTROL MEANS THEREFOR
Filed Dec. 12, 1958 3 Sheets-Sheet 1
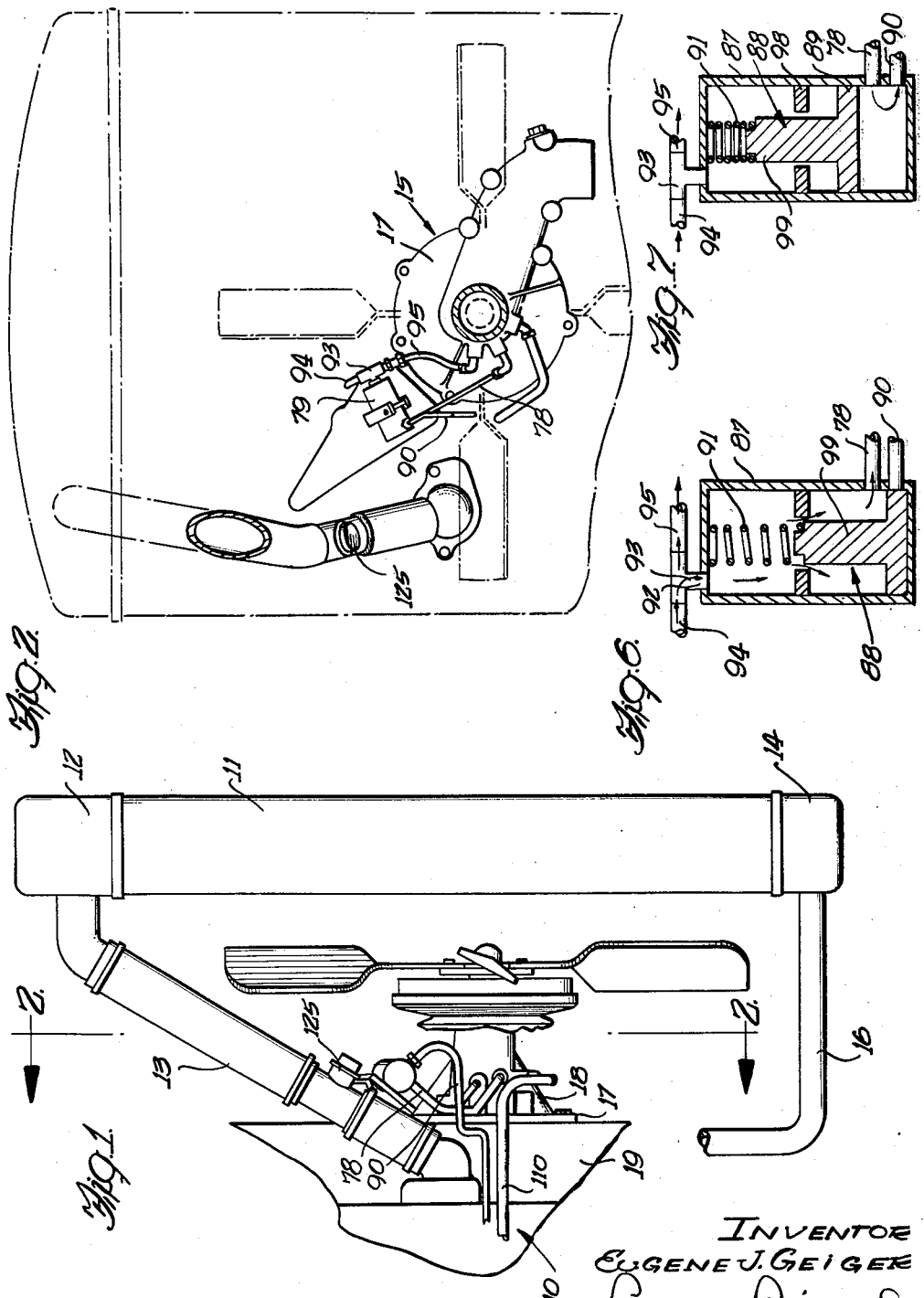
INVENTOR
EUGENE J. GEIGER
Paul O. Pippel
ATTORNEY

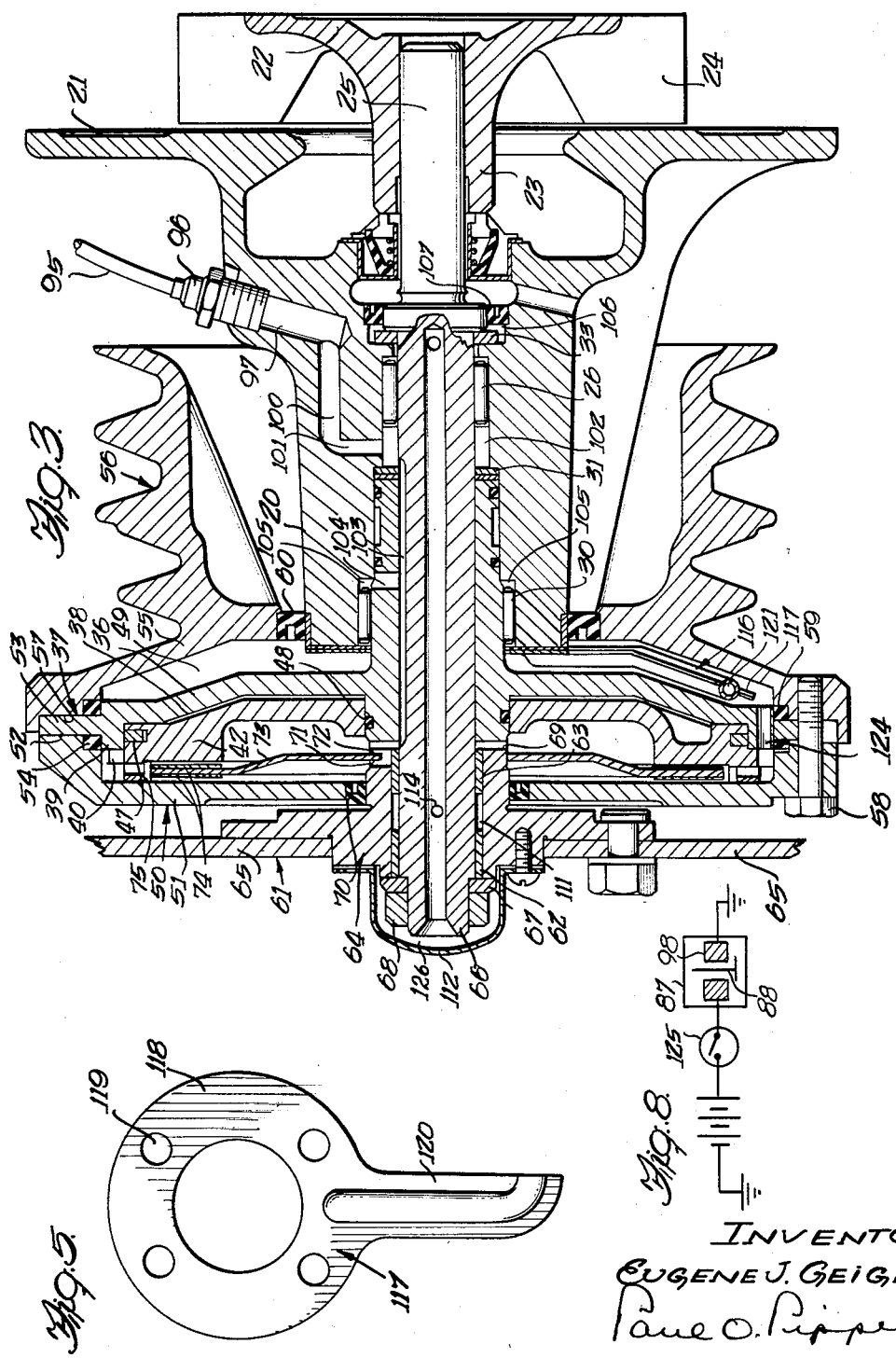

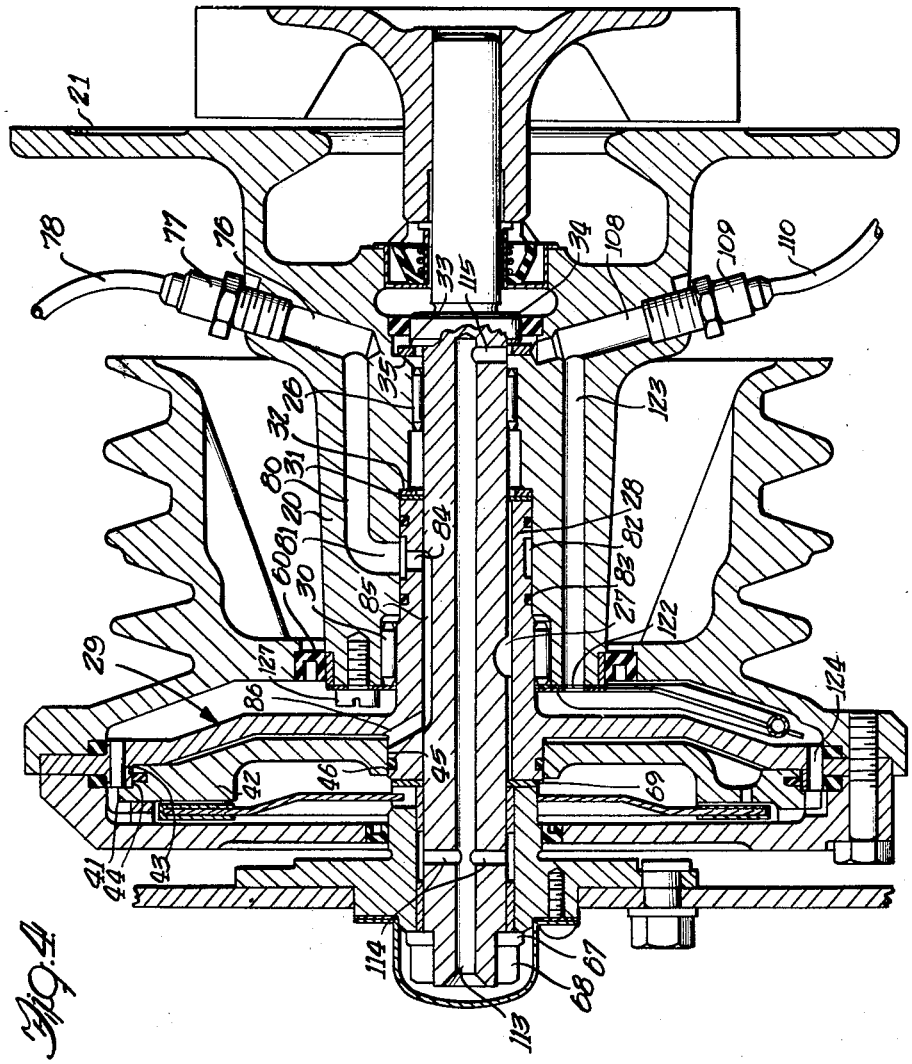

United States Patent Office 2,927,563
Patented Mar. 8, 1960

2,927,563

INTERNAL COMBUSTION ENGINE COOLING FAN STRUCTURE AND TEMPERATURE RESPONSIVE CONTROL MEANS THEREFOR

Eugene J. Geiger, Fort Wayne, Ind., assignor to International Harvester Company, Chicago, Ill., a corporation of New Jersey Application December 12, 1958, Serial No. 779,920

13 Claims. (Cl. 123—41.12)

This invention relates to an internal combustion engine cooling fan structure and temperature responsive control means therefor, and particularly to an engine temperature responsive hydraulically actuated friction clutch operable intermittently and automatically in accordance with engine temperature to establish and disestablish a drive connection between an engine cooling fan and a continuously rotating engine driven shaft.

Internal combustion engines are generally designed to operate most efficiently when the temperature thereof is maintained within a predetermined range. The majority of internal combustion engines used to propel motor vehicles employ a liquid cooling system whereby the engine temperature is controlled by controlling the temperature of the liquid coolant which is circulated through the engine and serves as a heat transfer medium. In liquid cooling systems liquid coolant is circulated through the engine where it absorbs heat and then is caused to pass through a heat exchanger or radiator where the heat-ladened coolant is allowed to dissipate some of the heat carried thereby to the air surrounding the heat exchanger before being returned to the engine. The cooling system generally includes an air fan designed to induce air flow through the radiator and about the engine of a velocity pressure in volume required to effect the maintenance of the engine temperature within its most efficient operating range under the most extreme conditions of use and ambient temperatures to which the motor vehicle and thus the engine may be subjected.

In conventional fan drive arrangements the fan is usually driven by a belt operatively connected to the engine crankshaft and hence the fan is rotated whenever the engine is running. The power consumed by the fan is wasted unless the engine is operating under the extreme conditions of use and ambient temperature noted above. Obviously, for the most part of its operating time the cooling effect provided by the fan is not only not necessary but in some instances is not desired. As an example, in the winter season or when the ambient air temperature is relatively low it is desirable to warm up the engine as quickly as possible at the starting. The engine warm-up time is unduly prolonged by the fan and hence the engine performance and operational economy is adversely affected. Oftentimes the engine of a motor vehicle can be maintained within the prescribed temperature range by the head wind alone created when the vehicle is being driven over the highways without the necessity of having the fan in operation.

It has long been recognized that it would be desirable to have the fan put into operation only if the cooling effect of the other parts of the cooling system is inadequate to properly maintain the temperature of the engine within the prescribed operating range. As a result there have been many devices devised in an attempt to provide a solution to the problem. However, the prior devices were not commercially successful since they were either highly complex and expensive structures to manufacture and maintain in good working order or they did not operate in an efficient manner to solve the problem. It is therefore the primary objective of the present invention to provide a compact fan drive structure of simple but yet sturdy and durable construction, and temperature responsive means for controlling the operation of the fan drive structure in accordance with engine temperature.

Still another object is the provision of a hydraulically actuated friction clutch for establishing and disestablishing power transmission to the fan, a solenoid operated control valve conditionable to supply hydraulic actuating fluid to the clutch, and a temperature sensitive switch for conditioning the valve.

Another object is the provision of a simple compact fan drive unit readily adaptable to conventional engines having pressure type lubricating systems wherein the fan drive unit includes a hydraulically actuated clutch and the pressurized lubricating oil from the engine lubricating system is utilized as a clutch actuating medium.

A further object is the provision of a fan drive unit operable intermittently and automatically in accordance with engine temperature and in which novel means are provided for continuously lubricating the various moving parts of the fan drive unit to reduce noise and wear of the parts and the power consumed by the unit.

A still further object is the provision of a hydraulically actuated clutch for a fan drive and a control valve therefor wherein novel means are incorporated in the clutch housing for maintaining the clutch housing substantially empty of actuating fluid and lubricant to thus eliminate viscous drag between the fluid and the relatively movable clutch parts.

The foregoing and other important objects and desirable features inherent in and encompassed by the invention together with many of the purposes and uses thereof will become readily apparent from a reading of the ensuing description in conjunction with the annexed drawings, in which:

Figure 1 is a fragmentary side elevational view of the forward end of an internal combustion engine embodying the invention;

Figure 2 is a vertical sectional view taken substantially along line 2—2 of Figure 1;

Figure 3 is a vertical sectional view of the fan drive unit embodying the invention;

Figure 4 is a view similar to Figure 3 with the exception that the section plane is angulated somewhat;

Figure 5 is a front elevational view of the scoop tube;

Figure 6 is a somewhat diagrammatic sectional view of the solenoid-actuated control valve;

Figure 7 is a view similar to Figure 6 illustrating the control valve in one operational position; and Figure 8 is a wiring diagram of the electrical circuit for controlling the operation of the solenoid.

Referring to the drawings in detail wherein like reference characters represent like elements throughout the various views, a fan drive unit or assembly embodying the invention is shown incorporated in an internal combustion engine designated generally by numeral 10. The engine 10 is provided with a conventional liquid coolant system which includes a heat exchanger or radiator 11 having its upper inlet header 12 suitably connected to the engine 10 by means of a flexible hose 13 and its lower discharge head 14 similarly connected to a coolant circulating pump 15 by means of a flexible hose 16.

The coolant circulating pump designated generally by numeral 15 includes a two-piece pump casing 17, the two pieces of the pump casing being designated by numerals 18 and 19, respectively. The pump casing part 18 is formed with an elongated generally cylindrical bearing section 20 having a radially extending flange 21 formed on one end thereof as shown in Figures 3 and 4.

The radially extending flange 21 is adapted to be fastened to the pump casing part 19 which, in turn, is suitably supported by the engine 10 or other supporting structure extending between the engine and the pump 15.

Disposed within the pumping chamber of the pump 15 is an impeller 22 which includes a hub 23 and a plurality of radially extending blades or vanes 24 integrally formed with the hub. The hub 23 is pressed on one end of a drive shaft 25. The shaft 25 extends through the cylindrical section 20 and is rotatably supported thereby by means of a needle type anti-friction bearing unit 26. A key element 27 is utilized to drivingly interconnect the shaft 25 and a tubular section 28 of a member 29. The tubular section 28 encircles the shaft 25 and extends into the tubular bearing section 20. A needle type anti-friction bearing unit 30, similar to the bearing unit 26, disposed at the end of the cylindrical bearing section 20 remote from the flange 21 is employed to rotatably support the member 29. The innermost end of the tubular section 28 is bottomed on an annular thrust bearing 31 which, in turn, bears against a shoulder 32 formed within the cylindrical bearing section 20. An annular radial thrust bearing 33 is also employed between a radial outwardly extending flange 34 formed integral with and intermediate the ends of the shaft 25 and a radial flange 35 projecting inwardly from the tubular section 20 adjacent one end of the antifriction bearing unit 26. From the foregoing it will be appreciated that the member 29 and shaft 25 are constrained for rotation in unison and are rotatably and axially supported by the cylindrical section 20 of the pump housing part 18.

The member 29 in addition to the tubular section 28 includes a generally radially extending circular plate 36 having its inner periphery integrally formed with the tubular section 28 intermediate the ends thereof and its outer periphery defined by a substantially L-shaped flange 37. The circular plate 36 defines one wall of a fluid pressure receiving cylinder 38 the purpose of which will be explained hereinafter. The annular axially extending leg portion 39 of the L-shaped flange 37 is provided with a plurality of circumferentially spaced slots 40 each of which being adapted to receive a respective radially extending lug 41 formed on the outer periphery of a plate-like piston member 42. The annular outer peripheral surface 43 of the piston member 42 slidingly engages the inner annular surface 44 of the axially extending portion 39 of the L-shaped portion 37 of the plate 36 and, similarly, the inner peripheral surface 45 of the piston member 42 slidingly engages the outer surface of the tubular section 28 disposed on the side of the plate 36 remote from the end thereof abutting the thrust bearing 31. Sealing rings 47 and 48 are provided between each pair of engaging surfaces 43, 44 and 45, 46, respectively. From the foregoing it will be appreciated that the piston member 42 is movable axially with respect to the member 29 but is constrained to rotate in unison therewith.

The piston member 42 and the fluid receiving chamber 38 are disposed within a fluid drainage chamber 49 partially defined by a housing 50. The casing or housing 50 includes a circular plate 51 which has an annular axially facing surface 52 thereof adjacent the outer periphery abutting one side of the radially extending portion 53 of the L-shaped flange 37 of the member 36. A fluid sealing ring 54 is operatively disposed between the abutting surfaces. The housing 50 also includes a generally radially extending portion 55 of a continuously driven pulley designated generally by numeral 56. The pulley 56 encircles the cylindrical bearing section 20 and is adapted to be continuously driven through the medium of a V-belt (not shown), which V-belt in turn is driven by a pulley (not shown) operatively connected to the engine crankshaft in a conventional manner. An axially facing surface 57 of the radial portion 55 abuts the portion 53 of the flange 37 and a plurality of circumferentially spaced bolts 58 are employed for fastening the plate 51, member 36 and the pulley 56 together. An O-ring 59, similar to the O-ring 54, is employed to seal the abutting surfaces of the member 36 and the pulley 56. The inner peripheral edge of the radially extending portion 55 is radially spaced from the exterior surface of the cylindrical bearing section 20 and an annular sealing ring structure 60 of conventional design is interposed in the radial space to prevent fluid leakage from the interior of the chamber 49. From the foregoing it will be appreciated that the pulley 56, housing 50, member 36, piston 42, and the shaft 25 continually rotate in unison whenever the internal combustion engine 10 is operating.

The end of the shaft 25 opposite the impeller 22 rotatably supports the cooling fan assembly designated generally by numeral 61 by means of a pair of spaced plain rotary bearings 62, 63. The fan assembly 61 includes a hub 64 to which is attached a plurality of circumferentially spaced radially extending blades 65. The outermost terminal end of the shaft 25 is defined by a reduced diameter threaded portion 66 which is adapted to receive a thrust washer 67 and a locknut 68 for maintaining the various parts in assembled relationship on the shaft 25. The innermost axial end of the hub 64 bears against one side of an annular radial bearing 69, which bearing also bears against one axial face of the tubular section 28 of the member 29. It will be appreciated that the fan assembly 61 is thus supported by the shaft 25 for rotation relatively thereto. A sealing ring 70, similar to the sealing ring 60, is employed between the inner peripheral surface of the plate 51 and the annular external surface of the fan hub portion in radial alignment therewith.

As shown in Figs. 3 and 4, the end portion of the fan hub 64 is provided with a series of circumferentially spaced notches 71, each of which is adapted to receive a respective lug 72 projecting radially from the inner periphery of a single disk clutch plate 73. By virtue of the notch and lug connection between the clutch plate 73 and the fan hub 64 it will be appreciated that the fan hub 64 and the clutch plate 73 are constrained for rotation together but the clutch plate 73 is capable of moving axially with respect to the fan hub. The outer end portion of the clutch plate 73 carries metallic friction material 74 on its oppositely facing axial surfaces. From the foregoing it will be appreciated that in order to drivingly connect the pulley 56 to the coolant fan assembly 61 the piston 42 is moved axially to the left as viewed in Figure 3, to firmly grip the clutch plate 73 between the housing plate 51 and the piston 42. A clutch disengaging spring 75 in the form of an annular metallic ring having a series of waves formed therein is positioned radially of the clutch plate 73 and is adapted to react between the piston 36 and the housing plate 51. The spring 75 serves as resilient means for maintaining the plate 71 and piston 42 separated and out of frictional engagement with the clutch plate 73.

A fluid inlet bore 76 is provided in the cylindrical bearing section 20 for receiving fluid under pressure for moving the piston 42 axially to the left as viewed in Fig. 4, to engage the clutch against the resilient action of the spring 75. One end of the bore 76 is provided with a threaded section for receiving a pipe fitting 77 attached to one end of a conduit 78. The opposite end of the conduit is in fluid communication with the interior of a solenoid operated control valve assembly designated generally by numeral 79. The innermost end of the bore 76 is in communication with one end of an axially extending bore 80 extending through the cylindrical bearing section 20. The opposite end of the bore 80 is in fluid communication with a relatively short radially inwardly extending bore 81. The bore 81, in turn, opens into an annular groove 82 formed in the external surface of the tubular section 28 of the member 29. A pair of axially spaced sealing rings 83 of conventional design are disposed in annular notches formed in the tubular section 28 on either side of the groove 82 to prevent fluid leakage between the relatively rotary surfaces of the cylindrical bearing section 20 and the tubular section 28. The groove 82 is in fluid communication with a relatively short passageway 84 extending through the tubular section 28 which, in turn, opens into one end of an axially extending groove 85 formed in the exterior surface of the drive shaft 25. As shown in Fig. 4, a bore 86 formed in the tubular section 28 extends from the interior of the fluid pressure receiving chamber 36 and one end of the groove 85. Thus, in order to couple the fan assembly 61 to the pulley 56 for rotation in unison fluid under pressure is introduced to the fluid pressure receiving chamber 38 through conduit 78 and the various bores and passageways described above of a sufficient magnitude to move the piston 42 axially to the left as viewed in Fig. 4, to compress the spring 75 and firmly grip the clutch disk 73 between the piston 42 and the housing plate 51.

As shown in Figs. 6 and 7, the end of the conduit 78 opposite its connection to the cylindrical bearing section 20 opens into the interior of a control valve housing or body 87. The control valve 79 includes a valve member 88 slidably mounted within the interior of the valve body 87. The valve member includes a land 89 which is movable between a position corresponding to the clutch engaged condition of the clutch wherein the opening of the conduit 78 into the valve housing 87 is uncovered and a position corresponding to the clutch disengaged condition wherein the conduit 78 is placed in fluid communication with a conduit 90 having one end opening into the valve housing 87 and its opposite end in fluid communication with the crankcase of the engine 10. A helically-wound compression spring 91 reacting against the valve member 88 and the housing 87 is employed for yieldably urging the valve member 88 to the clutch engaged position wherein fluid communication between the conduits 78 and 90 is disestablished. One leg 92 of a T fitting or pipe connection 93 is in communication with the interior of the valve body 87. A conduit 94 has one end in fluid communication with another of the legs of the T fitting 93 and its opposite end (not shown) suitably connected to the discharge side of the engine lubricating oil pump, whereby engine lubricating oil under pressure is continually directed to the interior of the valve body 87 whenever the engine 10 is in operation. A conduit 95 has one end connected to the third leg of the T fitting and its opposite end provided with a pipe fitting 96 which is threaded into the end of a generally radially extending bore 97 provided in the cylindrical bearing section 20. It will be apparent that regardless of the position of the valve member 88 within the valve housing 87 lubricant under pressure continually flows through the conduit 95 when the engine 10 is running. The valve member 88 is moved from the position shown in Fig. 6 to the position shown in Fig. 7 against the biasing action of the valve spring 91 by means of a solenoid 98 which includes a solenoid coil encircling an elongated portion 99 of the valve member 88 which serves as the core of the solenoid. Thus, when the solenoid 98 is energized the valve member 88 moves to a position wherein fluid communication between the interior space of the valve body 87 containing lubricant under pressure and the conduit 78 is disestablished, and fluid communication is established between the conduit 78 and the conduit 90 leading to the engine crankcase or oil sump. The electric circuit for energizing the solenoid 98, shown diagrammatically in Figure 8, is controlled by a thermo-sensitive switch 125. The temperature sensitive element of the switch 125 is disposed in fluid communication with the coolant flowing from the engine to the upper inlet header 12 of the radiator 11 through the flexible hose 13, as shown in Figure 1. The constructional details of the thermo-sensitive switch 125 will not be described inasmuch as the thermo-sensitive switch forms no part of the present invention per se. However, it will suffice to say that the switch 125 is conditioned to energize the solenoid circuit when the operating temperature of the engine, as evidenced by the coolant temperature flowing to the radiator, is below a predetermined value. The thermo-sensitive switch 125 is normally in a closed condition wherein the solenoid circuit is energized, but will open at a second predetermined coolant temperature and the circuit will remain deenergized until the coolant temperature falls to the first mentioned predetermined coolant temperature whereupon the solenoid circuit will be once again energized to disengage the fan drive clutch.

It will be appreciated that the present invention prevents overheating of the engine should the electrical circuit be broken for any reason since the fan will be connected, hydraulically, to the pulley.

As stated hereinbefore, it is an important object of the present invention to continuously supply the various bearings described above with an adequate supply of lubricant when the engine is running to reduce wear of the relatively movable parts and operating noise. Lubricant entering the bore 97 flows axially in a bore 100 and then radially inwardly through a bore 101. Bore 97 may be equipped with an orifice to reduce the flow of lube oil if deemed necessary. The lubricant in bore 101 flows into an annular space 102 between the anti-friction bearing unit 26 and the thrust bearing 31. Part of the lubricant flows axially to the right as viewed in Fig. 3, to lubricate the anti-friction bearing unit 26 and the radial thrust bearing 33 and the remainder of the oil flows axially to the left through an axially extending groove 103 formed in the exterior of the shaft 25. The radial thrust bearing 31 is lubricated by lubricant contained in the annular space 102. The anti-friction bearing unit 30 is lubricated by means of lubricant flowing radially outwardly from the groove 103 through a passageway 104 provided in the tubular section 28, as shown in Fig. 3. Oil being emitted from passageway 104 enters an annular space 105 between the anti-friction bearing unit 30 and a shoulder formed in the central bore of the cylindrical bearing section 20, as shown in Fig. 3.

The lubricant flowing axially through the anti-friction bearing unit 30 is discharged into the fluid drainage chamber 49. Oil flowing axially to the right through anti-friction bearing unit 26, as viewed in Figure 3, lubricates the radial thrust bearing 33 and is emitted into the annular space 106 between the radial thrust bearing 33 and the annular sealing ring 107 seated in the cylindrical bearing section 20 and adapted to engage the peripheral surface of the flange 34 of the shaft 25. One end of a radially extending bore 108 formed through the tubular bearing section 20 opens into the annular space 106. The opposite end of the bore 108 is threaded with internal threads for receiving a pipe fitting 109 which is attached to one end of a conduit 110. The opposite end of the conduit 110 is suitably connected to the engine crank case or oil sump in a suitable manner. The lubricant flowing axially in groove 103 which does not flow radially through bore 104 divides at the end of the groove where part of the oil flows radially outwardly and lubricates the thrust bearing 69 and is discharged in the space between the clutch plate 73 and the piston 42 and the remainder of the lubricant flows axially through the bronze rotary bearing 63 by virtue of the fact that the bronze bearing 63 has oil grooves formed therein as in conventional plain rotary bearings. The oil after passing through bearing 63 enters an annular space 111 between the bearings 62, 63 and then flows axially through the bronze bearing 62. A cap 112 is fastened to the fan hub 64 to cover the end of the shaft 25. The lubricant flowing from the bearing 62 enters the space 126 enclosed by the cap 112 and then flows axially in a central axially extending bore 113 extending through a major portion of the length of the shaft. To insure an adequate supply of lubricant for the bearing 62 the shaft 25 is provided with a plurality of radially extending bores 114 which establish fluid communication between the central bore 113 and the annular space 111. Thus part of the oil flowing axially to the right, as viewed in Figure 3, through the central bore 113 when the engine is in operation and the shaft 25 is rotating flows axially outwardly through the bore 114 because of centrifugal force acting on the oil. Thus bearing 62 is supplied with lubricant being emitted from the bearing 63 as well as by recirculated lubricant flowing radially through the bores 114. As shown in Figures 3 and 4, the shaft 25 is provided with a radially extending bore 115 which has one end in fluid communication with the annular space 106 and its opposite end in fluid communication with the innermost end of the axially extending central bore 113. From the foregoing it will be appreciated that all of the various seals are relieved of pressure by the lubrication system described above and thus are not apt to leak.

The lubricant flowing from the anti-friction bearing unit 30 and the thrust bearing 69 as well as the fluid leaking around the piston 42 from the fluid pressure receiving chamber 38 which would accumulate within the chamber 49 and thus cause a viscous drag between the fluid and the relatively movable clutch parts is removed. This is accomplished by a means of a scoop tube designated generally by numeral 116. The scoop tube 115 includes a pair of plates 117 arranged back-to-back and suitably fastened together. Each plate includes an annular portion 118 having registering apertures 119 therethrough for receiving cap screws 127 which are threaded into the end face of the cylindrical bearing section 20. Each plate 117 is provided with a leg 120 which extends radially from the circular attaching portion 118. Each leg is provided with an L-shape depression which is semi-circular in cross section to form a substantially L-shaped passageway 121 when the plates 117 are assembled together. As shown in Figure 3, the passageway 121 opens into the chamber 49 adjacent the outer periphery thereof and the opening of the passageway 121 faces in a direction opposite to the direction of rotation of the housing 50 at that point. Thus fluid contained within the chamber 49 is flung outwardly and accumulates at the other periphery of the chamber where the passageway 121 opens into the chamber when the pulley 56 is rotated. Inasmuch as the scoop tube 116 is stationary, the lubricant will be rammed into the passageway 121 where it flows radially inwardly and then through an opening 122 defining one end of the passageway. The opening 122 is in registration with one end of an axially extending bore 123 formed in the cylindrical bearing section 20. The opposite end of the bore 123 is in communication with the radially extending bore 108 as shown in Figure 4. The leg portion 39 of the L-shaped flange 37 is provided with a plurality of axially extending passageways 124 whereby the volume enclosed by the plate 36 and the plate 51 is in fluid communication with the annular space between the plate 36 and the radial portion 55 of the pulley 56. Thus lubricant is prevented from accumulating within the clutch housing 50 by means of the scoop tube structure 116.

The embodiment of the invention chosen for the purposes of illustration and description herein is that preferred as a result of selected tests based upon the requirements for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In an air flow control system for a liquid cooled internal combustion engine having a fluid pressure generating system comprising, engine driven shaft means; a cooling fan rotatably journalled on one end of said shaft means; fluid pressure operated clutch means operatively connected to said fluid pressure generating system for selectively establishing and disestablishing a drive connection between said fan and said shaft means, said clutch means including an annular housing encircling said shaft means and drivingly connected thereto; means for introducing fluid under pressure from said fluid pressure generating system of said engine to effect operation of said clutch means; and conduit means leading from the interior of said annular housing to the low pressure side of said fluid pressure generating system, said conduit means continually providing fluid communication between the interior of said annular housing and the low pressure side of said fluid pressure generating system.

2. In an air flow control system for a liquid cooled internal combustion engine having a fluid pressure generating system comprising, engine driven shaft means; a cooling fan rotatably journalled on one end of said shaft means; clutch means for selectively establishing and disestablishing a drive connection between said fan and said shaft means, said clutch means including an annular housing encircling said shaft means and drivingly connected thereto; fluid pressure operated actuator means for effecting operation of said clutch means to drivingly connect said fan and said shaft means, said actuator means being enclosed within said annular housing; means for introducing fluid under pressure from said fluid pressure generating system of said engine to effect operation of said actuator means; and conduit means leading from the interior of said annular housing to the low pressure side of said fluid pressure generating system including a stationary radially extending tube disposed within said annular housing, said tube having its radially outermost end adjacent the radially outermost interior surface of said housing.

3. In an air flow control system for a liquid cooled internal combustion engine having a fluid pressure generating system comprising, a stationary support; an engine driven shaft means; bearing means interposed between said stationary support and said shaft means for supporting said shaft means for relative rotation with respect to said stationary support, said bearing means including a rotary bearing element; clutch means for selectively establishing and disestablishing a drive connection between said fan and said shaft means, said clutch means including an annular housing encircling said shaft means and drivingly connected thereto; fluid pressure operated actuator means for effecting operation of said clutch means to drivingly connect said fan and said shaft means, said actuator means being enclosed within said annular housing; means for introducing fluid under pressure from said fluid pressure generating system of said engine to effect operation of said actuator means; means for conducting lubricant under pressure to one end of said bearing element, said clutch housing being adapted to receive lubricant flowing from said bearing element; and conduit means leading from the interior of said annular housing to the low pressure side of said fluid pressure generating system including a stationary radially extending tube disposed within said annular housing, the radially outermost end of said tube terminating adjacent the radially outermost interior surface of said housing.

4. In an air flow control system for a liquid cooled internal combustion engine having a pressure-type lubricating system comprising; a stationary support; engine driven shaft means; bearing means carried by said stationary support for rotatably supporting said shaft means, said bearing means including a rotary bearing element; a cooling fan; second bearing means rotatably journalling said cooling fan on one end of said shaft means; hydraulically actuated clutch means for selectively establishing and disestablishing a drive connection between said fan and said shaft means, said clutch means including an annular housing encircling said shaft means and drivingly connected thereto; means for introducing lubricant under pressure from said engine lubricating system to said clutch means to effect operation of said clutch means; means for conducting pressurized lubricant from said engine lubricating system to one end of said bearing element, said clutch housing being adapted to receive lubricant flowing from said bearing element; means for conducting pressurized lubricant from said engine lubricating system to one end of said second bearing means; conduit means leading from the opposite end of said second bearing means to the non-pressurized side of said engine lubricating system; and second conduit means in fluid communication with the interior of said clutch housing and said first conduit means.

5. In an air flow control system for a liquid cooled internal combustion engine having a pressure-type lubricating system comprising, a stationary support; engine driven shaft means; bearing means carried by said stationary support for rotatably supporting said shaft means, said bearing means including a rotary bearing element; a cooling fan; second bearing means for rotatably journalling said cooling fan on one end of said shaft means; clutch means for selectively establishing and disestablishing a drive connection between said fan and said shaft means, said clutch means including an annular housing encircling said shaft and drivingly connected thereto; hydraulically-operated actuator means for effecting operation of said clutch means to drivingly connect said fan and said shaft means, said actuator means being enclosed within said annular housing; means for introducing lubricant under pressure from said engine lubricating system to effect operation of said actuator means; means for conducting pressurized lubricant from said engine lubricating system to one end of said bearing element, said clutch housing being adapted to receive lubricant flowing from said bearing element; means for conducting pressurized lubricant from said engine lubricating system to one end of said second bearing means; conduit means leading from the opposite end of said second bearing means to the non-pressurized side of said engine lubricating system; and second conduit means in communication with the interior of said clutch housing and said first conduit means including an elongated radially extending tube affixed to said stationary support and disposed within said clutch housing, said tube extending radially and having its radially outermost end adjacent the radially outermost interior surface of said clutch housing.

6. In a cooling fan drive for an internal combustion engine having a liquid cooling system and a pressure-type lubricating system; a stationary support; a shaft; a continuously driven pulley encircling said shaft and drivingly connected thereto; a cooling fan journalled on one end of said shaft; means for rotatably supporting said pulley and shaft for relative rotational movement with respect to said stationary support including bearing means carried by said stationary support; clutch means for selectively establishing and disestablishing a drive connection between said cooling fan and shaft including an annular housing encircling said shaft and drivingly connected to said pulley; means for conducting lubricant from the high pressure side of said engine lubricating system to one end of said bearing means, said clutch housing being adapted to receive lubricant flowing from said bearing means; and conduit means in fluid communication with the interior of said clutch housing and the low pressure side of said engine lubricating oil system.

7. In an air flow control system for a liquid cooled internal combustion engine having a pressure-type lubricating system comprising, an engine-driven shaft; a cooling fan rotatably journalled on one end of said shaft; clutch means for selectively establishing and disestablishing a drive connection between said fan and said shaft, said clutch means including an annular housing encircling said shaft and drivingly connected thereto; hydraulically-operated actuator means for effecting operation of said clutch means to drivingly connect said fan and said shaft, said actuator means being enclosed within said annular housing; means for introducing lubricant under pressure from said engine lubricating system to effect operation of said actuator means; and conduit means leading from the interior of said annular housing to the low pressure side of said engine lubricating system including a stationary, radially extending tube means disposed within said annular housing, said tube means terminating adjacent the radially outermost interior surface of said housing and opening into said housing in a direction opposite to the direction of rotation of said housing.

8. In an air flow control system substantially as set forth in claim 7, in which, said tube means includes a substantially L-shaped tube with one leg of the tube extending radially and the other leg thereof extending in a direction opposite to the direction of rotation of the housing and serving as a scoop.

9. In a cooling fan drive for an internal combustion engine having a liquid cooling system and a pressure-type lubricating system; a stationary support; a shaft; a continuously driven pulley encircling said shaft and drivingly connected thereto, a cooling fan journalled on one end of said shaft; means for rotatably supporting said pulley and shaft for relative rotational movement with respect to said stationary support including bearing means carried by said stationary support; clutch means for selectively establishing and disestablishing a drive connection between said cooling fan and shaft including an annular housing encircling said shaft and drivingly connected to said pulley; means for conducting lubricant from the high pressure side of said engine lubricating system to one end of said bearing means, said clutch housing being adapted to receive lubricant flowing from said bearing means; and conduit means in fluid communication with the interior of said clutch housing and the low pressure side of said engine lubricating system including an elongated tube fixed to said stationary support and disposed within said clutch housing, and a scoop at the outer end of said tube and extending substantially perpendicular from said tube opposite to the direction of rotation of said housing and provided with an opening in the end thereof to receive lubricant when said pulley is rotated so that said housing is maintained substantially drained of lubricant.

10. In a cooling fan drive for an internal combustion engine having a liquid cooling system and a pressure-type lubricating system, a coolant circulating pump having a rotatable impeller; a shaft for driving said impeller; a cooling fan rotatably journalled on one end of said shaft; an engine-driven pulley drivingly connected to said shaft; clutch means for selectively drivingly connecting and disconnecting the pulley and the fan, said clutch means including an annular housing encircling said shaft and rotatable therewith; hydraulically-operated clutch actuating means in said housing operatively connected to said engine lubricating system for actuating said clutch means to drivingly connect said pulley and fan together; and means for conducting lubricant from the interior of said housing to the low pressure, suction side of said engine lubricating system including an elongated tube disposed within said housing and extending radially with respect to the axis of rotation of said shaft, and a scoop at the outer end of said tube adjacent the outermost peripheral interior surface of said housing, said scoop extending in a direction opposite to the direction of rotation of said annular housing and having an opening therein adapted to receive lubricant when said pulley is rotated so that said annular housing is maintained substantially drained of lubricant.

11. An air flow control system for a liquid cooled internal combustion engine having a pressure-type lubricating system comprising a coolant circulation pump having a pump housing part provided with an elongated cylindrical bearing section; a shaft extending through said bearing section having a pump impeller fixed to one end thereof, the opposite end of said shaft projecting beyond one end of said bearing section; a fan including a hub rotatably supported on the projecting end of said shaft; a continuously engine-driven pulley encircling said bearing section; an annular housing axially spaced between the ends of said shaft, a radially extending wall portion of said housing being integrally formed with said pulley; a clutch disk rotatably secured to said fan hub and disposed within said annular housing; a piston and cylinder assembly within said annular housing for forcing said clutch disk into frictional engagement with the interior surface of a wall portion of said annular housing to effect a drive connection between said pulley and said fan upon admission of lubricant under pressure from said engine lubricating system, said piston and cylinder assembly including a cylinder having an annular plate portion and a tubular portion keyed to said shaft, a portion of said tubular portion being interposed between said shaft and a section of said tubular bearing section, said plate having its outer periphery secured to said annular housing; bearing means interposed between said tubular bearing section and said tubular portion, one end of said bearing means being in communication with the interior of said annular housing; means for introducing pressurized lubricant from said engine lubricating system to the opposite end of said bearing means; and outlet conduit means in fluid communication with said annular space and the non-pressurized side of said engine lubricating system.

12. An air flow control system for a liquid cooled internal combustion engine having a pressure-type lubrication system comprising a coolant circulating pump having a pump housing part provided with an elongated cylindrical bearing section; a shaft extending through said bearing section having a pump impeller fixed to one end thereof, the opposite end of said shaft projecting beyond one end of said bearing section; a fan including a hub rotatably supported on the projecting end of said shaft; a continuously engine-driven pulley encircling said bearing section; an annular housing axially spaced between the ends of said shaft, a radially extending wall portion of said housing being integrally formed with said pulley; a clutch disk rotatably secured to said fan hub and disposed within said annular housing; a piston and cylinder assembly within said annular housing for forcing said clutch disk into frictional engagement with the interior surface of a wall portion of said annular housing to effect a drive connection between said pulley and said fan upon admission of lubricant under pressure from said engine lubrication system, said piston and cylinder assembly including a cylinder having an annular plate portion and a tubular portion keyed to said shaft, a portion of said tubular portion being interposed between said shaft and a section of said tubular bearing section, said plate having its outer periphery secured to said annular housing; bearing means interposed between said tubular bearing section and said tubular portion, one end of said bearing means being in communication with the interior of said annular housing; means for introducing lubricant from said engine lubrication system to the opposite end of said bearing means; and outlet conduit means in fluid communication with said annular space and the non-pressurized side of said engine lubrication system including a stationary tube projecting radially outwardly from the inner portion of said space to the outer portion of said space, said tube having a scoop at the outer end thereof adapted to receive any lubricant contained in said annular space so that said annular space is maintained substantially drained of lubricant when said annular housing is rotated.

13. In a cooling fan drive for an internal combustion engine having a liquid cooling system and a pressure-type lubricating system, a stationary support having an elongated cylindrical bearing section; a shaft extending through said bearing section having one end projecting from one end of said bearing section; a cooling fan; a continuously driven pulley encircling said shaft and bearing section; clutch means including an element drivingly connected to said pulley and another element drivingly connected to said fan, hydraulically-operated clutch actuator means operatively connected to said lubrication system of said engine for drivingly connecting said elements of said clutch means upon the attainments of a predetermined coolant temperature; said actuator means including a piston and cylinder assembly, said cylinder being drivingly connected to said pulley and having a tubular section drivingly connected to said shaft, said tubular section having an end portion extending into said bearing section; first bearing means rotatably supporting said fan on said projecting shaft and axially spaced second and third bearing means, said second bearing means being interposed between said shaft and said bearing section and said third bearing section being interposed between said tubular section and said bearing section for supporting said shaft and pulley for relative rotational movement with respect to said stationary support; means for conducting lubrication from the pressure side of said engine lubricating system to said first, second, and third bearing means and returning the same to the low pressure side of the lubricating system including means for introducing lubricant under pressure to one axial end of each of said bearing means, a first chamber for receiving lubricant flowing from said first bearing means, a second chamber for receiving lubricant flowing from said second bearing means, an annular housing defining an annular space, said annular housing enclosing said clutch means and said actuator means, said annular housing being adapted to receive lubricant flowing from said third bearing means, conduit means leading from said second chamber to the low pressure side of said lubricating system, duct means extending between said first and second chambers, and conduit means in fluid communication with said annular space and said conduit means leading from said second chamber to said low pressure side of said lubricating system including a stationary tube projecting radially outwardly from the inner portion of said space to the outer portion of said space, and a scoop at the outer end of said tube and adapted to receive lubricant when said pulley is rotated so that said annular space is maintained substantially drained of lubricant.

References Cited in the file of this patent

UNITED STATES PATENTS

| 2,661,148 | Englander | Dec. 1, 1953 |
| 2,706,468 | Willcox | Apr. 19, 1955 |